T. S. EIDEM.
ROTARY CULTIVATOR.
APPLICATION FILED MAR. 8, 1911.

1,008,708.

Patented Nov. 14, 1911.

2 SHEETS—SHEET 1.

T. S. EIDEM.
ROTARY CULTIVATOR.
APPLICATION FILED MAR. 8, 1911.

1,008,708.

Patented Nov. 14, 1911.

2 SHEETS—SHEET 2.

Witnesses
J. Milton Jester.
V. Randolph Jr.

Inventor
Torsten S. Eidem
By J. A. Gourick
Attorney

COLUMBIA PLANOGRAPH CO., WASHINGTON, D. C.

UNITED STATES PATENT OFFICE.

TORSTEN S. EIDEM, OF HAGER CITY, WISCONSIN.

ROTARY CULTIVATOR.

1,008,708. Specification of Letters Patent. Patented Nov. 14, 1911.

Application filed March 8, 1911. Serial No. 613,049.

*To all whom it may concern:*

Be it known that I, TORSTEN S. EIDEM, a citizen of the United States, residing at Hager City, in the county of Pierce and State of Wisconsin, have invented certain new and useful Improvements in Rotary Cultivators, of which the following is a specification.

My invention relates to machines for cultivating plowed land and ridding it of the roots of weeds and is particularly adapted for eradicating what is known as "quack grass," and has for its object the provision of a machine that will effectually remove the roots of weeds and leave the land in a soft and loamy condition.

My invention will be described in detail hereinafter and illustrated in the accompanying drawings in which—

Figure 1:
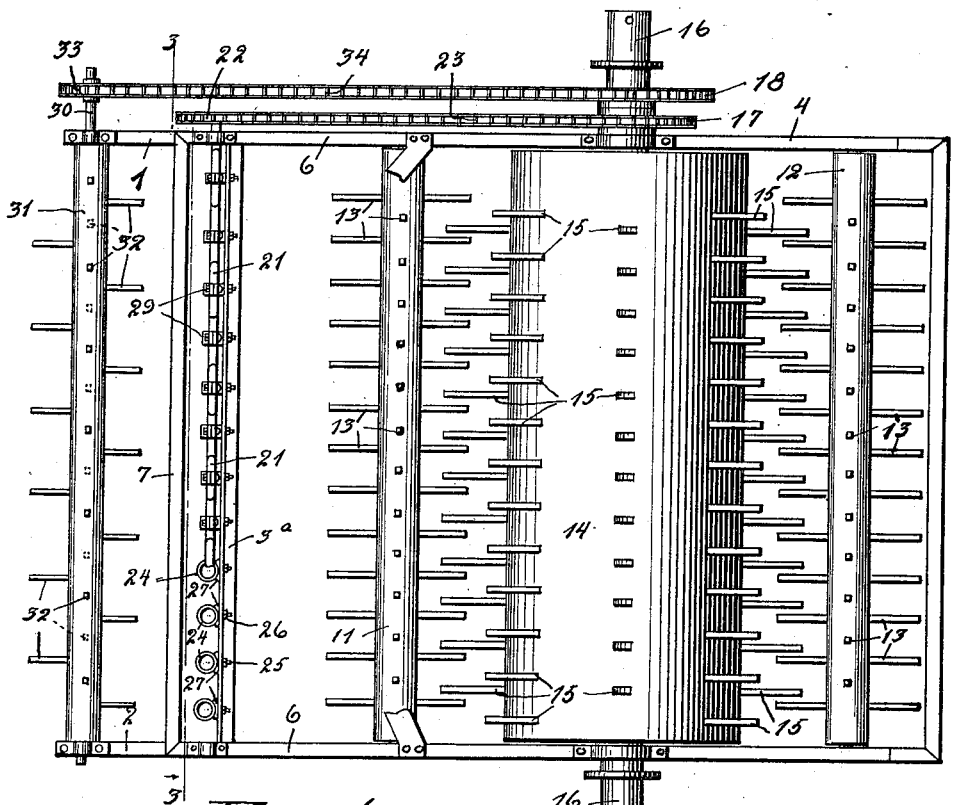
Figure 2:
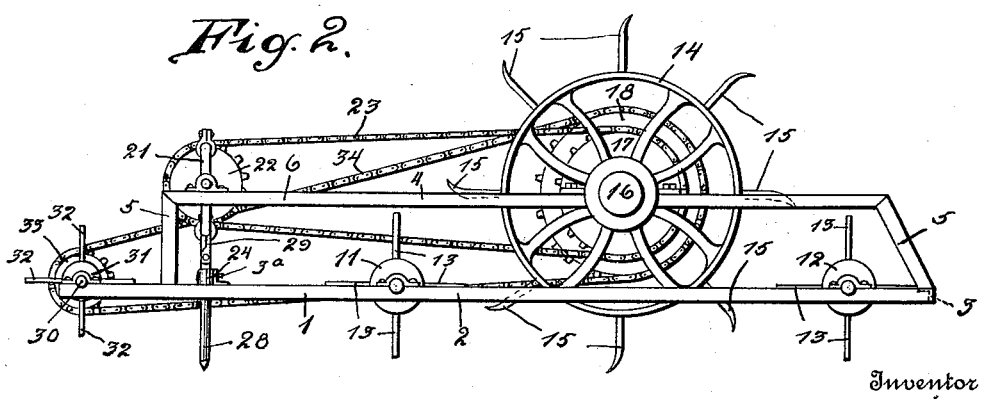
Figure 3:
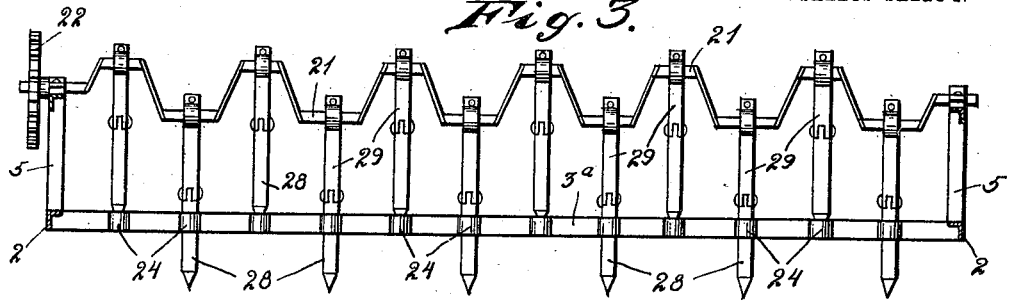
Figure 4:
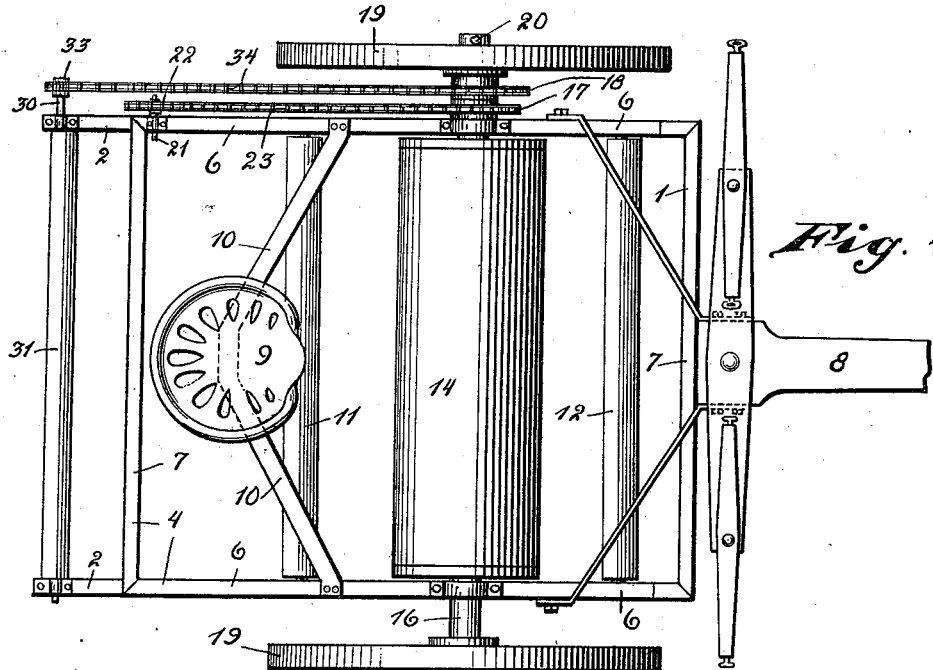
Figure 5:
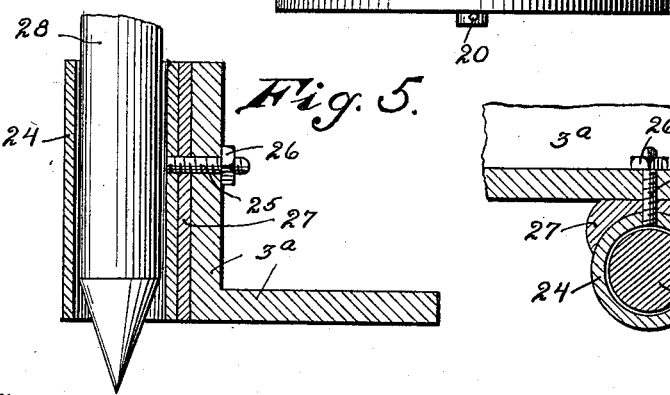
Figure 6:
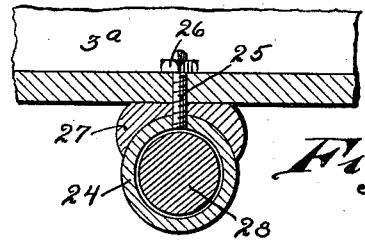

Figure 1 is a top plan view of my improved machine, Fig. 2, a side view, Fig. 3, a cross section on the line 3—3 of Fig. 1, Fig. 4, a plan view of the frame and driving roller, showing the machine mounted on wheels for transportation and the driver's seat in position, the other parts being omitted, and Figs. 5 and 6, detail views of the guides for the reciprocating fingers.

In the drawings similar reference characters will be used to indicate corresponding parts in all of the views.

The base frame 1 of my improved machine consists of the side bars 2 and cross bars 3 and 3ª made preferably of angle-iron. Mounted on base frame 1 is a frame 4 consisting of uprights 5, longitudinal bars 6 and cross-bars 7 also made of angle-iron.

8 indicates the draft pole, secured to bars 6, and 9 the seat mounted on the support 10 secured to said bars 6.

11 and 12 indicate rollers journaled on the base frame 1 and having teeth 13 extending therefrom, the teeth being shown in four rows with the teeth of one row out of alinement with the teeth of the adjoining rows.

14 indicates a roller, larger in diameter than the rollers 11 and 12, journaled on bars 6, and mounted between said rollers 11 and 12, said roller having a plurality of rows of teeth 15 that are out of alinement with each other and are so arranged that they will not interfere with the teeth on said rollers 11 and 12. The shaft 16 on which the roller 14 is mounted is extended at each side of the machine and has sprocket wheels 17 and 18 secured thereto and is also adapted to receive traction wheels 19 that are held in place by pins 20 when it is desired to transport the machine to and from the field.

21 indicates a crank shaft journaled on bars 6 and having a sprocket wheel 22 secured thereto that is geared to the sprocket wheel 17 by means of chain 23.

24 indicates tubular guides secured to cross-bar 3ª by means of threaded bolts 25 secured thereto and extending through the bar, 26 indicating nuts secured to the bolts to secure the guides to cross-bar 3ª, and 27 projections on the bar to prevent the tubular guides from turning.

28 indicates pins slidably mounted in tubular guides 24 and 29 links pivotally secured to the heads of the pins and to the cranked portions of the shaft 21.

In operation, when the machine is in use, the pins 28 reciprocate in the guides 24 and as the pins 28 will drag through the soil, the tubular guides serve to clean them of any soil that may adhere to them.

30 indicates a shaft journaled at the rear end of frame 1 and having a roller 31 mounted thereon with rows of teeth 32 projecting therefrom, the teeth in each row being out of line with the teeth in all of the other rows.

33 indicates a sprocket wheel secured to shaft 30 and 34 a chain geared to sprocket wheels 18 and 33, the ratio between said sprocket wheels 18 and 33 being such that shaft 30 rotates more rapidly than shaft 16 so that the teeth 32 rake through the soil and serve to throw the roots out on the surface of the ground where they will be exposed to the sun's rays and be dried up, or may be gathered up and used to feed swine.

In operation the teeth on the three forward rollers and the pins actuated by the crank shaft thoroughly pulverize the soil so that the teeth 32 on roller 31 can be easily dragged therethrough to rake out the roots of the weed known as "quack grass" or any other weed roots, as referred to above, and after the machine has passed over the ground it will be in condition for seeding.

Having thus described my invention what I claim is:—

1. In a cultivator, toothed rollers, a crank shaft journaled to the rear of said toothed rollers and geared to one of said rollers, pins slidably mounted and operatively secured to said shaft, a roller journaled to the rear of said crank shaft and geared to one of the toothed rollers to rotate more rapidly than the actuating roller, and teeth secured to said geared roller.

2. In a cultivator, a frame, toothed rollers journaled on the frame, one of said rollers having sprocket wheels secured thereto, a crank shaft journaled on the frame rearwardly of the toothed rollers, a sprocket wheel secured to said shaft and geared to one of the sprocket wheels on the toothed roller aforesaid, pins slidably mounted and operatively secured to said crank shaft, a roller suitably journaled on the frame rearwardly of said crank shaft, a sprocket wheel secured to said roller and geared to a sprocket wheel on the toothed roller aforesaid, said gearing being so arranged that the rearmost roller rotates more rapidly than the actuating roller, and teeth secured to said geared roller.

In testimony whereof I hereto affix my signature in the presence of two witnesses.

TORSTEN S. EIDEM.

Witnesses:
GEORGE THOMPSON,
C. E. HOFFMAN.

Copies of this patent may be obtained for five cents each, by addressing the "Commissioner of Patents, Washington, D. C."